(12) United States Patent
Johnsen et al.

(10) Patent No.: US 8,095,617 B2
(45) Date of Patent: Jan. 10, 2012

(54) CACHING DATA IN A CLUSTER COMPUTING SYSTEM WHICH AVOIDS FALSE-SHARING CONFLICTS

(75) Inventors: Bjørn Dag Johnsen, Oslo (NO); Rabin A. Sugumar, Sunnyvale, CA (US); Ben Sum, Cumming, GA (US); Lars Paul Huse, Oppegård (NO)

(73) Assignee: Oracle America Inc., Redwood City, CA (US)

( * ) Notice: Subject to any disclaimer, the term of this patent is extended or adjusted under 35 U.S.C. 154(b) by 268 days.

(21) Appl. No.: 12/495,635

(22) Filed: Jun. 30, 2009

(65) Prior Publication Data

US 2010/0332612 A1 Dec. 30, 2010

(51) Int. Cl.
*G06F 15/16* (2006.01)
(52) U.S. Cl. ......... 709/212; 709/201; 709/217; 709/219
(58) Field of Classification Search ................... 709/201, 709/212, 217, 219
See application file for complete search history.

(56) References Cited

U.S. PATENT DOCUMENTS

| | | | |
|---|---|---|---|
| 5,448,698 A | 9/1995 | Wilkes | |
| 6,125,399 A | 9/2000 | Hamilton | |
| 6,704,831 B1 | 3/2004 | Avery | |
| 7,496,095 B1 | 2/2009 | Davis | |
| 7,542,986 B2 * | 6/2009 | Lubbers et al. | 1/1 |
| 7,627,729 B2 * | 12/2009 | Bartfai et al. | 711/162 |
| 2003/0023666 A1 | 1/2003 | Conway et al. | |
| 2004/0064639 A1 * | 4/2004 | Sicola et al. | 711/114 |
| 2005/0286526 A1 * | 12/2005 | Sood et al. | 370/394 |
| 2008/0127203 A1 | 5/2008 | Huang et al. | |

OTHER PUBLICATIONS

International Search Report and Written Opinion for Application No. PCT/US2010/026911, mailed Aug. 20, 2010; 15 pages.
Office Action for U.S. Appl. No. 12/402,804, mailed Sep. 20, 2010; 16 pages.
"InfiniBand Architecture Specification vol. 1, Release 1.2.1"; Infiniband Trade Association; Nov. 2007; 1727 pages.
Michael L. Scott; "Shared Memory Models"; Workshop on Communication and Middleware for Parallel Programming Models; Apr. 2002; 29 pages.
Leonidas Kontothanassis, Robert Stets, Galen Hunt, Umit Rencuzogullari, Gautam Altekar, Sandhya Dwarkadas, and Michael L. Scott; "Shared Memory Computing on Clusters with Symmetric Multiprocessors and System Area Networks", ACM Transactions on Computer Systems, vol. 23, Issue 3, Aug. 2005; 33 pages.
Yong Xiong, Jyh-Charn Liu, and Wei Zhao; "On the Smoothing of Traffic Flows Using ON-OFF Control"; Real-Time Systems Symposium, Work-in-Progress Session, Dec. 3, 2003; 3 pages.

(Continued)

*Primary Examiner* — Djenane Bayard
(74) *Attorney, Agent, or Firm* — Meyertons Hood Kivlin Kowert & Goetzel, P.C.; Jeffrey C. Hood; Joel L. Stevens (57) ABSTRACT

Managing operations in a first compute node of a multi-computer system. A remote write may be received to a first address of a remote compute node. A first data structure entry may be created in a data structure, which may include the first address and status information indicating that the remote write has been received. Upon determining that the local cache of the first compute node has been updated with the remote write, the remote write may be issued to the remote compute node. Accordingly, the first data structure entry may be released upon completion of the remote write.

15 Claims, 7 Drawing Sheets

OTHER PUBLICATIONS

Fabrizio Petrini, Wu-Chun Feng, Adolfy Hoisie, Salvador Coll, and Eitan Frachtenberg; "The Quadrics Network: High-Performance Clustering Technology"; Los Alamos National Laboratory; IEEE Micro 22(1) Jan.-Feb. 2002; pp. 46-57.

* cited by examiner

CACHING DATA IN A CLUSTER COMPUTING SYSTEM WHICH AVOIDS FALSE-SHARING CONFLICTS

FIELD OF THE INVENTION

The present disclosure relates generally to computing clusters having a large number of compute nodes, and more particularly to a method for caching data within compute nodes of a computing cluster.

DESCRIPTION OF THE RELATED ART

A cluster generally refers to a group of computers that have been linked or interconnected to operate closely together, such that in many respects they form a single computer. Large clusters can comprise thousands of individual computer systems that have been linked together. The components (e.g., individual computers or "compute nodes") of a cluster are often connected to each other through local area networks via network adapters. Clusters generally provide greatly improved performance and/or availability over that provided by a single computer. A cluster is also typically more cost-effective than a single computer of comparable speed or availability.

A cluster generally comprises a plurality of compute nodes (e.g., servers) and the "interconnect" between these compute nodes. An important aspect to building large cluster systems is the interconnect. The interconnect may comprise a "fabric", e.g., the network that connects all of the servers together, as well as host adaptors that interface each of the computer systems (servers) to the fabric. One commonly used cluster interconnect is Ethernet. More recently, clusters have started using Infiniband as the interconnect. InfiniBand (IB) is a switched fabric communications link primarily used in high-performance computing and provides quality of service and failover features as well as scalability. An Infiniband interconnect generally provides lower latency, higher bandwidth, and improved reliability.

Many organizations such as research centers and national laboratories require large clusters with thousands of nodes to satisfy their compute requirements. It is very important to reduce the overhead of communication in such large clusters to allow applications to scale efficiently.

One problem in computing clusters relates to allowing nodes to cache remote memory while avoiding conflicts when multiple nodes update different parts of the same cache line in memory. Another problem relates to allowing multiple CPUs within the same node to cache remote memory while maintaining coherency among themselves relative to local updates of the cached remote memory.

Therefore, improved methods are desired for caching of data for compute nodes in a cluster.

SUMMARY OF THE INVENTION

Various embodiments are presented of a system and method for caching data within compute nodes of a computing cluster. More specifically, the method may relate to managing operations in a first compute node of a multi-computer system, wherein the multi-computer system comprises a plurality of compute nodes coupled together by a network fabric.

In one embodiment, when a process executing on a first compute node wishes to update a remote memory location that it may have cached, and when the cache line of the memory location includes data that may be updated from multiple nodes, the process may issue a remote write to the location through one mapping. The process may then issue a normal store to the cache line through a cacheable mapping. The process then may issue a signal store to the cache line through a third mapping to signal to the network adaptor that the local cache line update has completed.

One embodiment of the invention may operate as follows. A network adaptor on the first compute node may receive a remote write to a first address of a remote (second) compute node that it may recognize as a special remote write from the mapping. The remote write may be issued by a first process executing on the first compute node. Accordingly, the network adaptor on the first compute node may create a first data structure entry in a data structure. The data structure entry may include the first address and status information indicating that the remote write has been received.

The network adaptor on the first node may receive a writeback operation to the first address prior to the determination of local cache of the first compute node being updated with the remote write. In response to the writeback operation to the first address, the network adaptor may update the status information in the first data structure entry to indicate that the writeback operation has been received for the first address. The first node may also save the writeback data of the writeback operation in the first data structure entry, e.g., for a later read.

The writeback operation may not be propagated onto the network, e.g., based on data structures maintained by the first compute node. For example, the first compute node may maintain at least one memory map that represents prefetchable cacheable remote memory. The first compute node may also maintain at least one memory map that represents uncached remote memory. The first compute node may determine that the first address of the writeback operation is in the first memory map. Upon that condition, the writeback operation may not be propagated onto the network. In other words, the writeback operation may be inhibited (or prevented) from being propagated onto the network.

The network adaptor on the first compute node may receive a read of the first address prior to completion of the local update. The network adaptor may determine that at least one data structure entry exists for the first address and may also determine that the status information indicates that a writeback operation has been received for the first address. In response, the first compute node may return the writeback data from the at least one data structure entry in response to the read of the first address.

Prior to completion of the local update, the network adaptor on the first compute node may receive a remote write to the first address from a second process executing on the first compute node. Similar to above, the network adaptor may create a second data structure entry in the data structure. The second data structure entry may include the first address and status information indicating that the remote write has been received for the first address. When a writeback operation is received to the first address, the status information may be updated in the first and second data structure entries to indicate that the writeback operation has been received. The writeback data may be saved in the first and second data structure entry.

The network adaptor may determine that the local cache of the first compute node has been updated with the remote write, e.g., through the signal store (although other embodiments are envisioned). For example, the first node may determine that a write has occurred to a physical memory address that has a predefined association with the first address. In response to that determination, the first node may issue the remote write to the remote (second) compute node and release the first data structure entry upon completion of the remote write. Issuing the remote write to the remote compute node after determining that the local cache of the first compute node has been updated with the remote write may inhibit or prevent a remote CPU of the remote compute node from seeing the remote write before the remote write is visible to a local CPU of the first compute node.

BRIEF DESCRIPTION OF THE DRAWINGS

A better understanding of embodiments of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Definitions

Compute Node—refers to a computer system having one or more processors (or CPUs) and memories. A Compute Node may have a single processor (which may be single core or multi-core) or may have a plurality of processors. One example of a Compute Node is a blade server.

Local Node—refers to the Compute Node corresponding to a local reference. For example, the Compute Node associated with a particular CPU would be the CPU's Local Node.

Network Fabric—refers to a network or interconnect for connecting multiple Compute Nodes.

Compute Node Interface Device (or "Network Adaptor")—refers to an interface for coupling a Compute Node to a Network (or Network Fabric), e.g., of the cluster.

Remote Location—refers to a location on another machine on a network or cluster.

Figure 1:
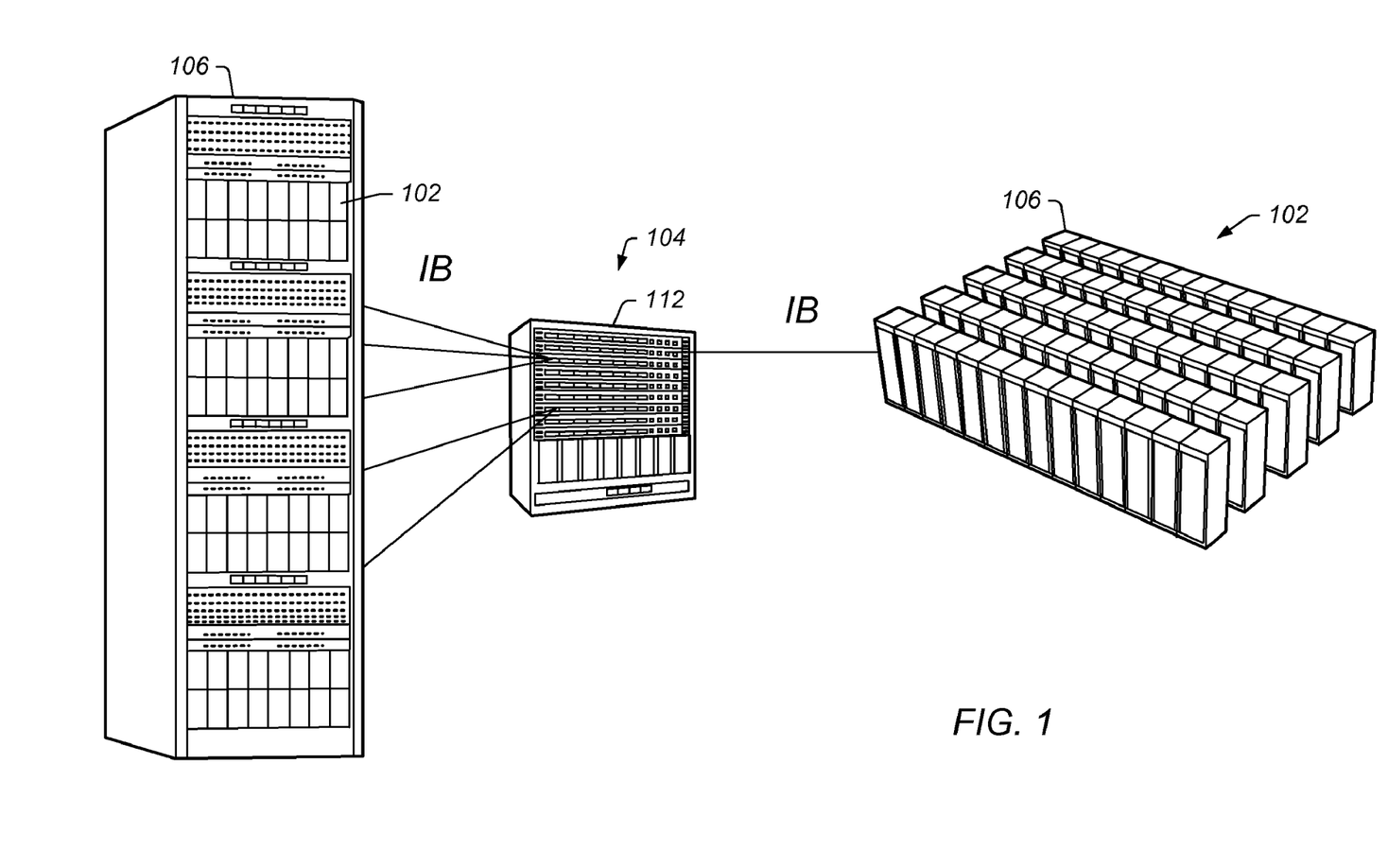
FIG. 1 illustrates an exemplary cluster according to one embodiment of the invention.

FIG. 1—Exemplary Cluster System

FIG. 1 illustrates an exemplary cluster system according to one embodiment of the invention. As shown, the system may comprise a plurality of computer systems or compute nodes 102 that are connected together by an interconnect 104. The compute nodes 102 may take various forms. In the embodiment of FIG. 1, the compute nodes 102 comprise blade servers that are housed in one or more racks 106. The interconnect 104 may comprise a fabric switch 112 as shown. The interconnect 104 may support only a single protocol, or may support a plurality of protocols. In the exemplary embodiment shown, the interconnect 104 may support the Infiniband (IB) protocol.

The cluster comprises one or more racks 106 each comprising 4 blade server chassis' which each comprise a plurality of blade servers (compute nodes) 102. The blade servers 102 connect to the fabric switch 112 through Infiniband. In one embodiment, the blade servers 102 connect to the fabric switch 112 over Infiniband in all cases. As shown, the fabric switch 112 may couple to additional racks 106 having additional compute nodes 102.

Each of the compute nodes 102 may couple to (or comprise) a compute node interface device, also referred to herein as a "Network Adaptor" or Scalable Interface (SIF), (110 FIG. 2) which provides an interface for the respective compute nodes 102. The compute node interface device or SIF 110 couples to a respective compute node 102 and provides an IB interface for the compute node 102 to the fabric 104, e.g., to the fabric switch 112. The compute node interface device 110 is mostly referred to herein as a "Network Adaptor" for the sake of convenience.

Figure 2:
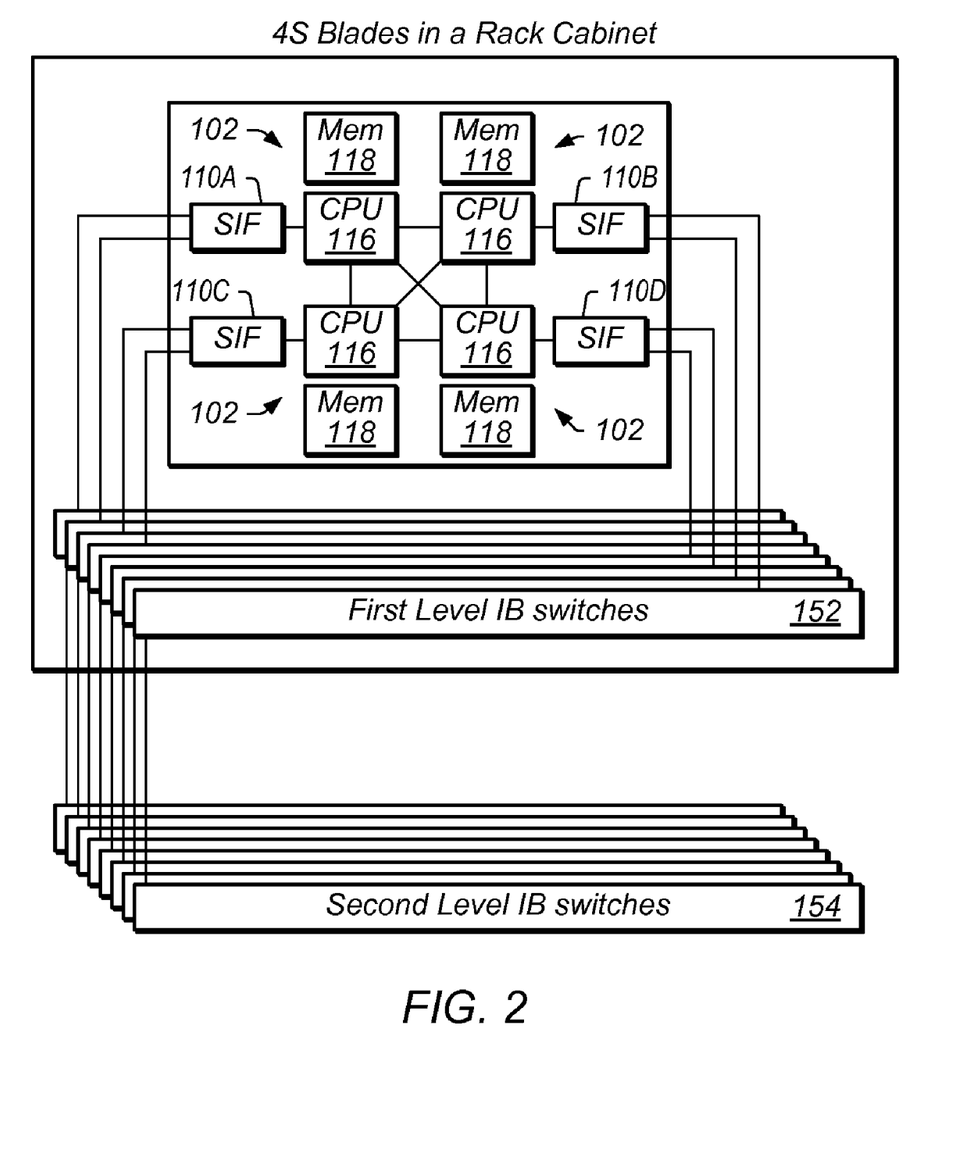
FIG. 2 is a block diagram of a portion of the cluster of FIG. 1, showing an exemplary compute node (4 server blade) connected to several levels of switches.

FIG. 2—Block Diagram of an Exemplary Portion of a Cluster System

FIG. 2 is a block diagram illustrating a portion of a cluster system comprising an exemplary server blade (compute node 102) connected to form the cluster. Each compute node 102 may comprise a corresponding Scalable Interface (SIF) block (compute node interface device or network adaptor) 110 (labeled as 110A-110D). Each compute node 102 couples to its respective Scalable Interface (SIF) 110A-D also located on the blade server. The SIF blocks 110 (110A-110D) may each provide an Infiniband interface to a respective compute node 102. The SIF blocks 110 (110A-110D) may each comprise a host interface for coupling to the host bus or processor bus of its respective compute node 102, as well as an Infiniband interface. The SIF block 110 is discussed in more detail with respect to FIG. 3.

Each of the SIF blocks 110 (110A-110D) may couple to Infiniband switches 152, referred to in FIG. 2 as First Level IB switches 152. The First Level IB switches 152 in turn may couple to Second Level IB switches 154, as shown. The First Level IB switches 152 may couple to the Second Level IB switches 154 through cables, as shown. There may be additional levels of IB switches.

Figure 3:
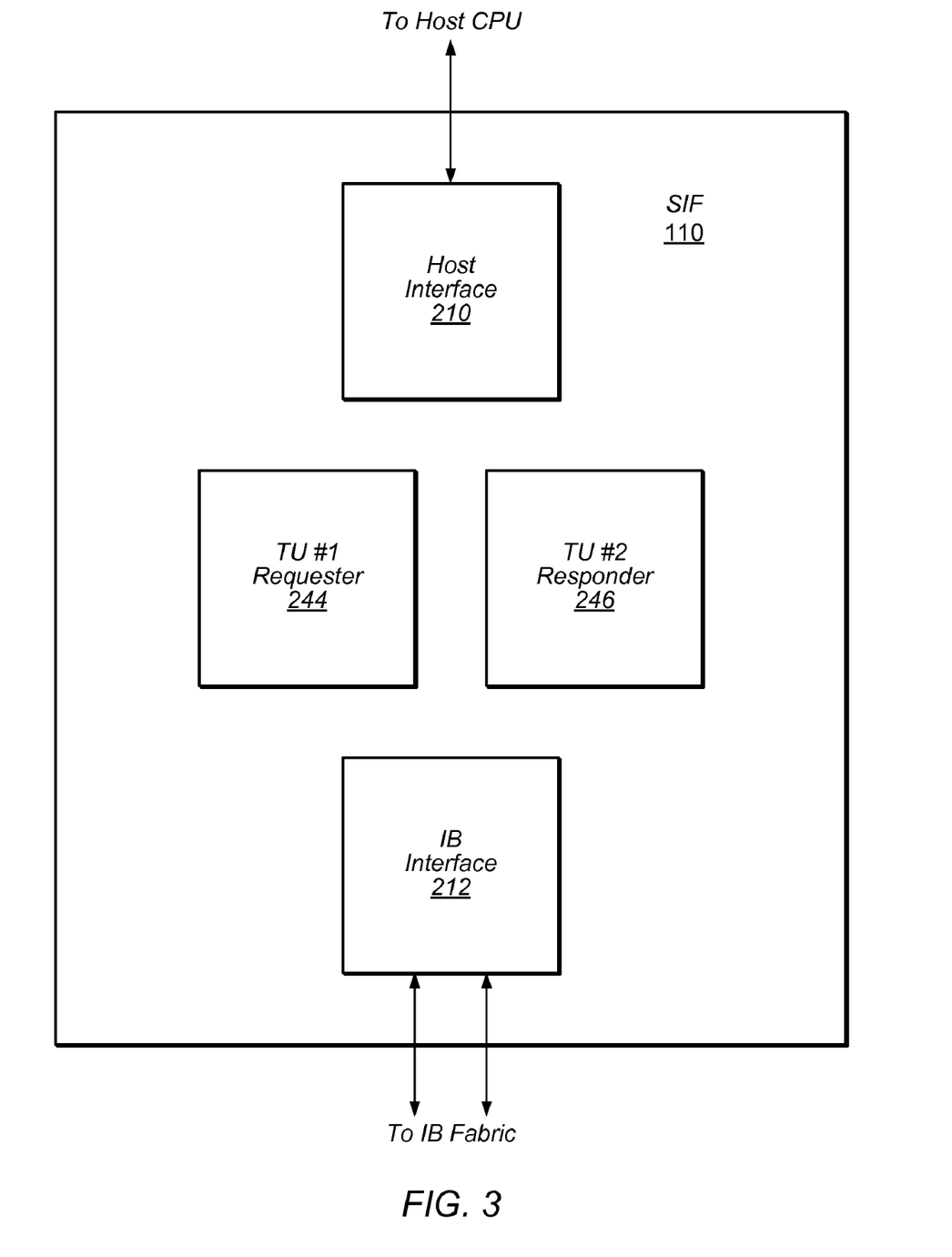
FIG. 3 is a block diagram of an exemplary scalable interface (SIF) used in interconnecting the various compute nodes in the cluster of FIG. 1.

FIG. 3—Block Diagram of an Exemplary SIF

FIG. 3 is a block diagram of an exemplary Scalable Interface (SIF) block (compute node interface device or network adaptor) 110. The SIF network adapter 110 may operate as an interface or I/O adapter for each compute node 102 in the cluster. In one embodiment, the SIF 110 does not include a general purpose CPU and does not execute an operating system, and hence is a hardware-centric structure. The SIF 110 may provide various services in hardware that would normally require software execution.

As shown, the SIF block 110 includes a host bus interface 210 for coupling to a computer system, e.g., in blade server 102. The SIF block 110 also includes a network fabric interface such as Infiniband interface 212, for coupling to Infiniband, e.g., for coupling to the network fabric 104.

The exemplary SIF block 110 may comprise a TU#1 (Transaction Unit) Requestor block 244 and TU#2 Responder block 246. The TU#1 Requestor block 244 may generate/process requests that are provided to other computer systems. The TU#2 Responder block 246 may be responsible for responding to incoming packets, e.g., incoming send requests from other compute nodes 102. The TU#1 Requestor block 244 and the TU#2 Responder block 246 may each couple to the host bus interface 210 and the IB interface 212.

TU#1 244 may be the Requester TU. In one embodiment, all requests sent by SIF 110 go through one of the TUs. SIF 110 may support the Infiniband (IB) reliable communication protocol, whereby in one implementation every request is properly acknowledged by the receiver before the request is completed at the sender. SIF 110 may support multiple command registers for applications to deposit commands—each command register typically dedicated to a host process running on a core. As the deposited commands are kicked off with doorbells, the commands may merge into a stream of commands that then feeds into the TU scheduler which schedules them onto available threads/command-slots on the 64 thread engine. A doorbell is a write issued by software running on a CPU to an address mapped to a device (such as a network adapter) which causes the device to perform some action (such as sending a packet over the network fabric). Thus, a doorbell is analogous to a house doorbell in the sense that it tells the device that some new action is needed.

TU#2 246 may be the Responder TU. All incoming requests may be directed to the Responder TU (TU#2) 246 which processes the packet, ultimately delivering the packet to off-chip or on-chip memory or to other logic for processing collectives.

The SIF 110 may comprise memory management circuitry which may assist in managing memory write commands as described herein. The memory management circuitry may be coupled to the host interface 210 and the network interface 212. The memory management circuitry may be comprised in one or more of the host interface 210, the TU#1 244 and/or the TU#2 246, as desired.

Figure 4:
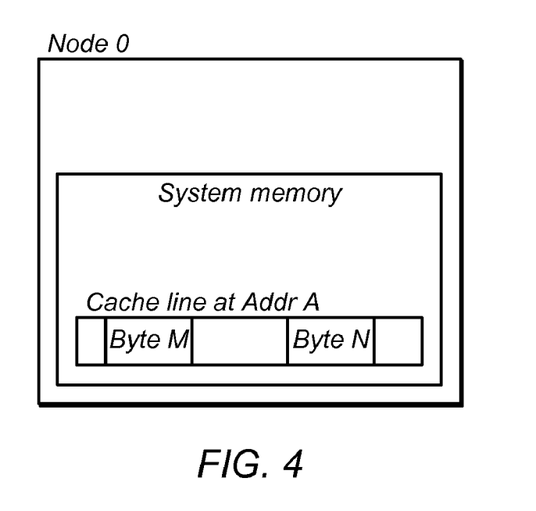
FIG. 4 illustrates a line of system memory in a compute node which may be updated by other nodes.

FIG. 4—Cached Line of System Memory

FIG. 4 illustrates a cached line of system memory in a compute node, referred to as Node 0. As shown, the cache line at Address A may include a Byte M and Byte N. Presume a situation where Node 1 desires to write Byte M of the line, and Node 2 desires to write Byte N of the line, where M is not equal to N. After both operations are complete the line should include the non overlapping updates from both Node 1 and Node 2.

Normally, in fully cache coherent systems, ownership of the line will be serialized among the nodes. Thus Node 1 may first own the line, update it, and then transfer ownership to Node 2 which will then update it. In one embodiment, the network adaptors (SIFs) in the system do not support full cache coherence, e.g., because full hardware cache coherence over large systems (1000s of nodes) may be very complex and there are performance limitations as the system scales in size.

Accordingly, Node 1 and Node 2 may simultaneously own the line. Without special support Node 1 and Node 2 may writeback the line to memory at different times, and the second write will overwrite the first, resulting in a cache line which does not include the updated values for either N or M (depending on write order). Various embodiments described herein provide a solution to ensure consistent updates of lines in the cache.

Figure 5:
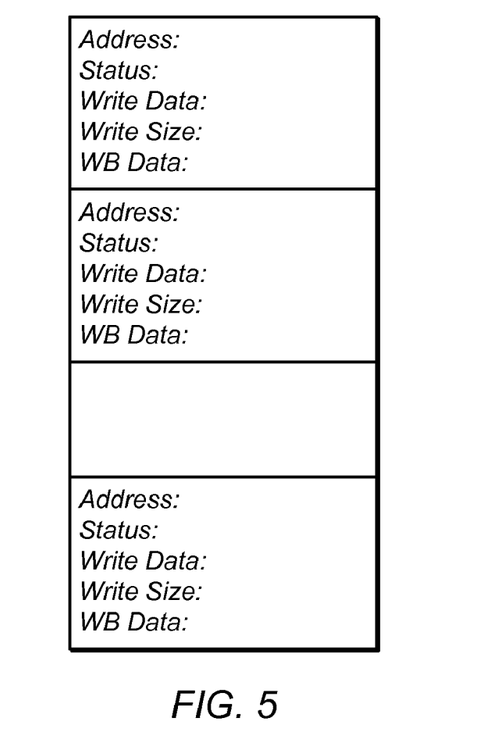
FIG. 5 illustrates a remote store tracking structure according to one embodiment of the invention.

FIG. 5—Exemplary Tracking Structure

FIG. 5 illustrates a remote store tracking structure which may be used according to one embodiment, described in FIG. 6 below. As shown, the remote store tracking structure may include a plurality of tracking entry data structures, where each tracking entry data structure relates to an address of a memory/cache line. As shown, each tracking entry data structure may store an address of a memory/cache line, status information, and writeback data. The status information may indicate either "remote write received for line", "writeback received for line", or "signal write received for line". In other words, the status information may indicate whether a remote write has been received for the line, a writeback has been received for the line, or a signal write has been received for the line. The writeback data field in the remote store tracking structure may contain data written back when the status is "writeback received for line". In some embodiments, only a small number of entries may be used per each compute node, e.g., 32 entries per node.

The tracking structure may also include a "size" field which may indicate the size of the remote write (e.g., byte, half-word, word, etc.) and a "data" field which may store the data stored by the remote write (described in more detail below).

Figure 6:
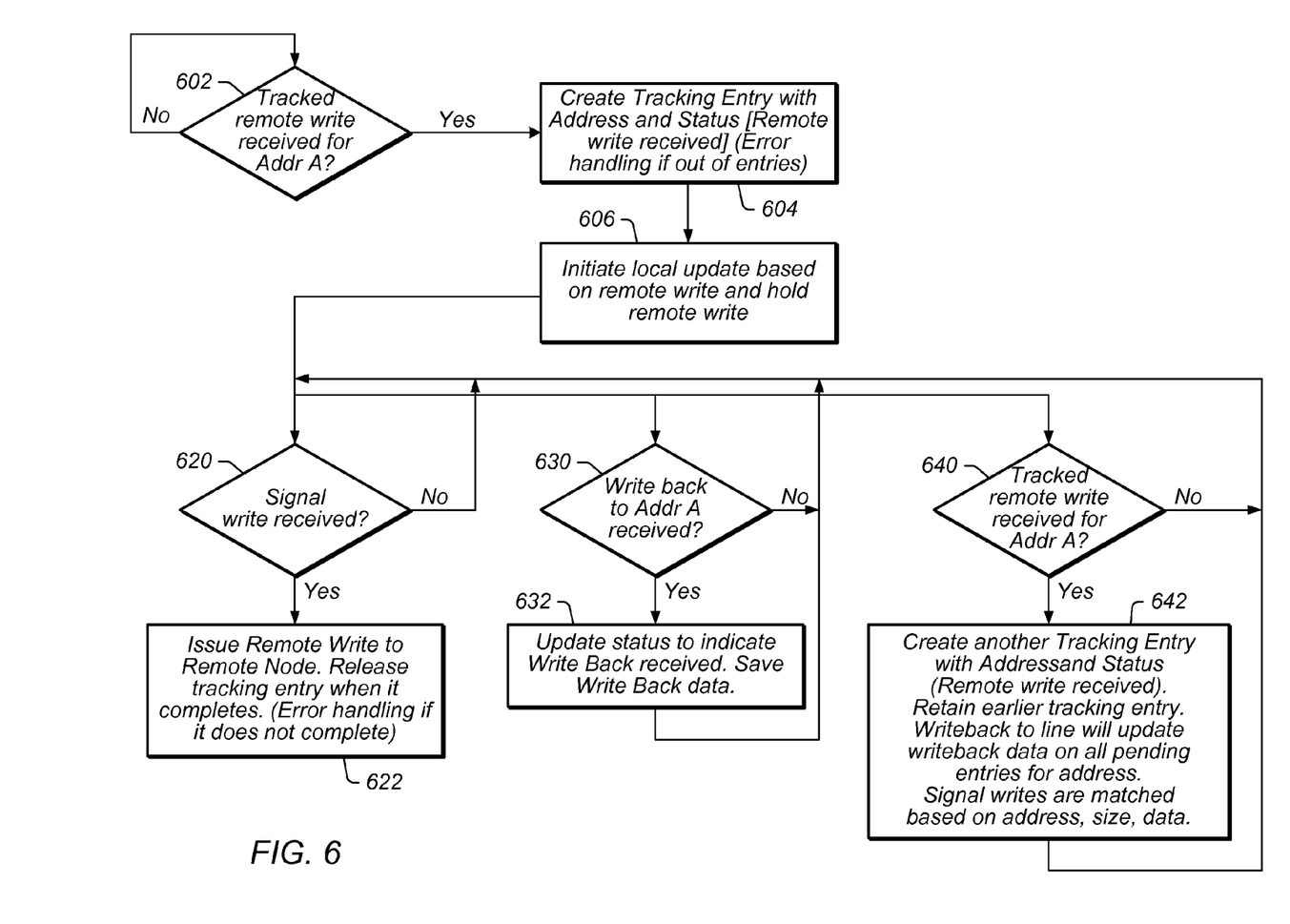
FIG. 6 is a flowchart diagram illustrating operation during a tracked write sequence received for an address (address A) according to one embodiment of the invention.

FIG. 6—Exemplary Operation During a Tracked Write Sequence for an Address

FIG. 6 is a flowchart diagram illustrating one embodiment of operation during a tracked write sequence for an address. The method may be performed by software executing on a local node and may be assisted the network adaptor described above. More specifically, the network adaptor may perform various actions in response to different stores which may be issued by software (shown in FIG. 7). Various method elements may be added, omitted, modified, or performed in a different order.

As shown in 602, the method may determine if a tracked remote write has been received for an address (e.g., address A). The remote write may be received from a process executing on a local (first) node that is for updating a memory on a remote (second) node at the address.

A remote write may be tracked if it is determined that more than one compute node will write to or "owns" the data being written. For example, if only a single node accesses or uses the data at the address, then it may not be tracked since coherency will not be an issue. However, if more than one node (or possibly process) will write to or "own" the data at the address, then the write may be tracked. In some embodiments, a map or table may be used to determine if a specific address or cache line is tracked and correspondingly, if remote writes to that address is tracked. Thus, when a tracked remote write is received (e.g., for address A in the example shown), the method may continue to 604. However, if not, the method remains in 602, e.g., polling (or simply waiting) to determine if a tracked remote write has been received.

In 604, a data structure (referred to as a "tracking entry") may be created in the tracking entry data structure (such as shown in FIG. 5) with the address A and status information. The status information stored in the tracking entry is "remote write received", reflecting the fact that a remote write was received in 602. If the remote store tracking structure is full, i.e., has no more entries, then error handling may be performed.

In 606, a local update may be initiated based on the remote write. The local update may update the local cache and/or memory of the local node with the value included in the remote write. In other words, the value that is being changed by the remote write may be updated on the local cache and/or local memory so that the local cache/memory and the remote memory will be consistent upon update by the remote write. At the same time, before, or after the initiation of the local update, the remote write may be held until the local update completes. The remote write may be held to ensure that no race conditions occur which result in incorrect data reads, as described in more detail below.

After creating the tracking entry in 604 and/or initiating the local update in 606, various checks may be performed, e.g., based on incoming events. For example, in 620, it may be determined if a signal write has been received. In 630, it may be determined if a writeback to address A has been received. In 640, it may be determined if a tracked remote write to address A has been received. In other words, when any of these events occur, the method may perform the corresponding action shown in 622, 632, and 642, respectively. These events and corresponding actions are each described below, in turn. Steps 630 and 632 and steps 640 and 642 may be performed only if they occur prior to a signal write being received in 620.

In 620, a signal write may be received. A signal write may indicate that the local cache and/or the local memory of the local node has been updated with the remote write. In other words, the signal write may indicate that the local update initiated in 606 has completed. In some embodiments, the determination of the signal write may include determining that a write has occurred to a predefined physical memory address that is mapped to the process issuing the remote write.

Upon completion of the local update, in 622, the remote write may be issued and the tracking entry may be discarded. Issuing the remote write to the remote compute node after the determination of the local update may inhibit or prevent the remote CPU of the remote compute node from "seeing" the remote write before the changes are reflected on the local system (e.g., before the remote write is visible to a local CPU of the local node issuing the remote write). Upon completion of 622, the method of FIG. 6 may be completed. Note that error handling may be performed in case the remote write does not succeed.

In 630, a writeback to Address A may be received before the local update is completed (before the signal write is received in 620). The writeback may indicate that the information or variable being updated in the remote write is being discarded from local cache. However, since this information is more up to date than the remote memory, it may be stored in the tracking entry. More specifically, if a writeback to Address A is determined to be received in 630, then in 632, the status information may be updated to "writeback received for line" to indicate that a writeback has been received. Additionally, the writeback data may be saved into the writeback data field of the tracking entry of the remote store tracking structure.

Note that if a writeback is not received before the local update is completed, the method may complete in 620 and 622 as described above. Note further that the writeback operation may not be propagated to the network, e.g., the local SIF may discard the writeback operation. In some embodiments, this may be determined by the use of memory maps or other data structures. For example, the method may include maintaining at least one memory map which represents prefetchable cacheable remote memory and maintaining at least another map which represents uncached remote memory. Thus, during 630, the method (e.g., the SIF) may determine that the first address of the writeback operation is in the cacheable memory map and may disregard or not propagate the writeback operation accordingly. Upon completion of 632, the method may return to an event waiting status, e.g., for when the local update is completed. Thus, 630 and 632 handle the exception where a writeback is received for data of a remote write before the remote write is completed.

In 640, a tracked remote write may be received for address A before the local update is completed (before the signal write is received in 620). If a tracked remote write is determined to have been received in 640, then in 642 another tracking entry for Address A may be used and the status for that entry may be "Remote write received for line". Note that the earlier tracking entry creating in 604 is retained. Upon completion of 642, the method may return to an event waiting status, e.g., for when the local update is completed. Thus, 640 and 642 handle the exception where another remote write is received before the remote write of 604 is completed.

Note that if a writeback is received after 640 and 642, but before the signal write is received (either for the remote write of 604 or the remote write of 642), the writeback to the line updates the writeback data on all pending entries for the address. Additionally, signal writes are distinguished (between the remote write of 604 and the remote write of 642) based on address, size and data.

Further exemplary details and implementations of the method of FIG. 6 are described below.

Figure 7:
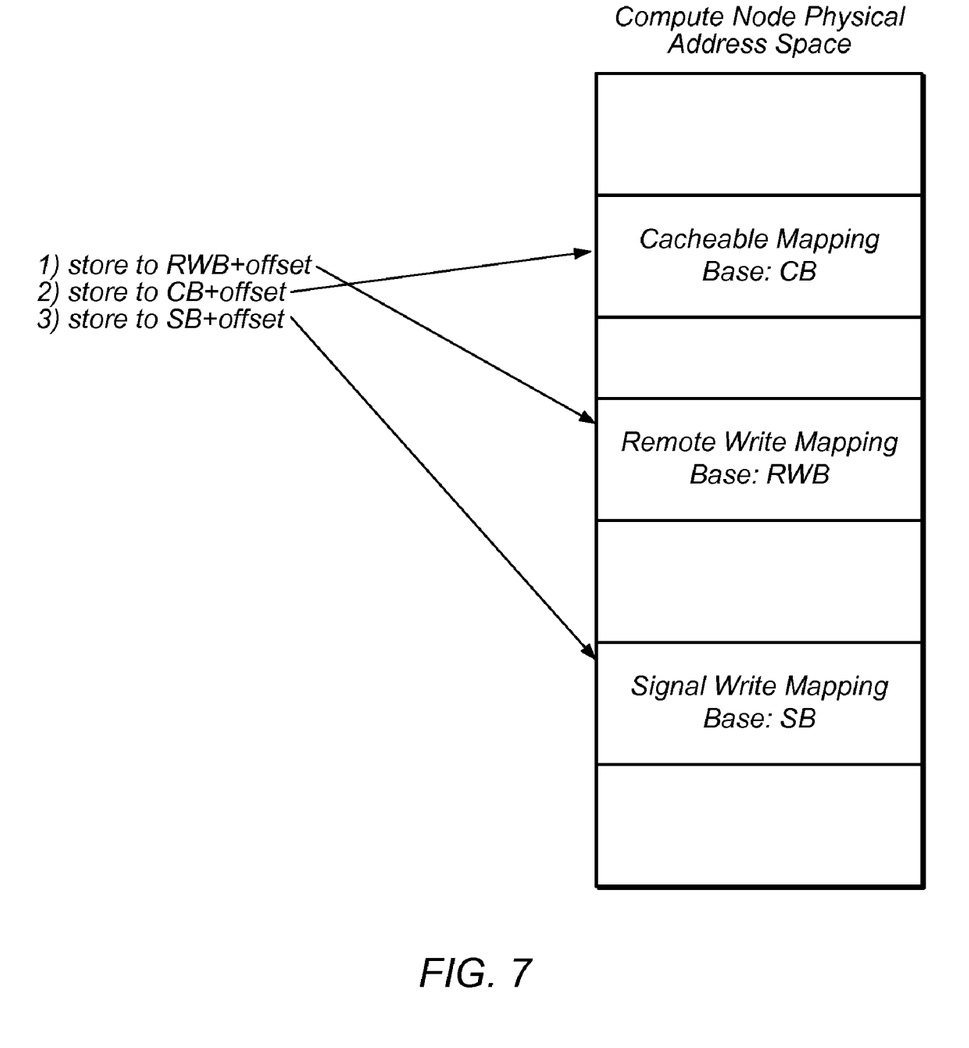
FIG. 7 illustrates a remote store, local store, signal store sequence, according to one embodiment.

FIG. 7—Exemplary Stores

FIG. 7 illustrate three exemplary stores which may be issued by software. As shown, the local node may first store to remote write mapping base (RWB) at a specific address, store to cacheable mapping base (CB) at another specific address, and may finally store to signal write mapping base (SB) at a specific address. Each of these address may be mapped to the first address described above, e.g., through an MMU on the network adapter. Thus, the method described above may perform three stores, a first for the remote write, a second for a cacheable store, and a third for the signal write.

Figure 8:
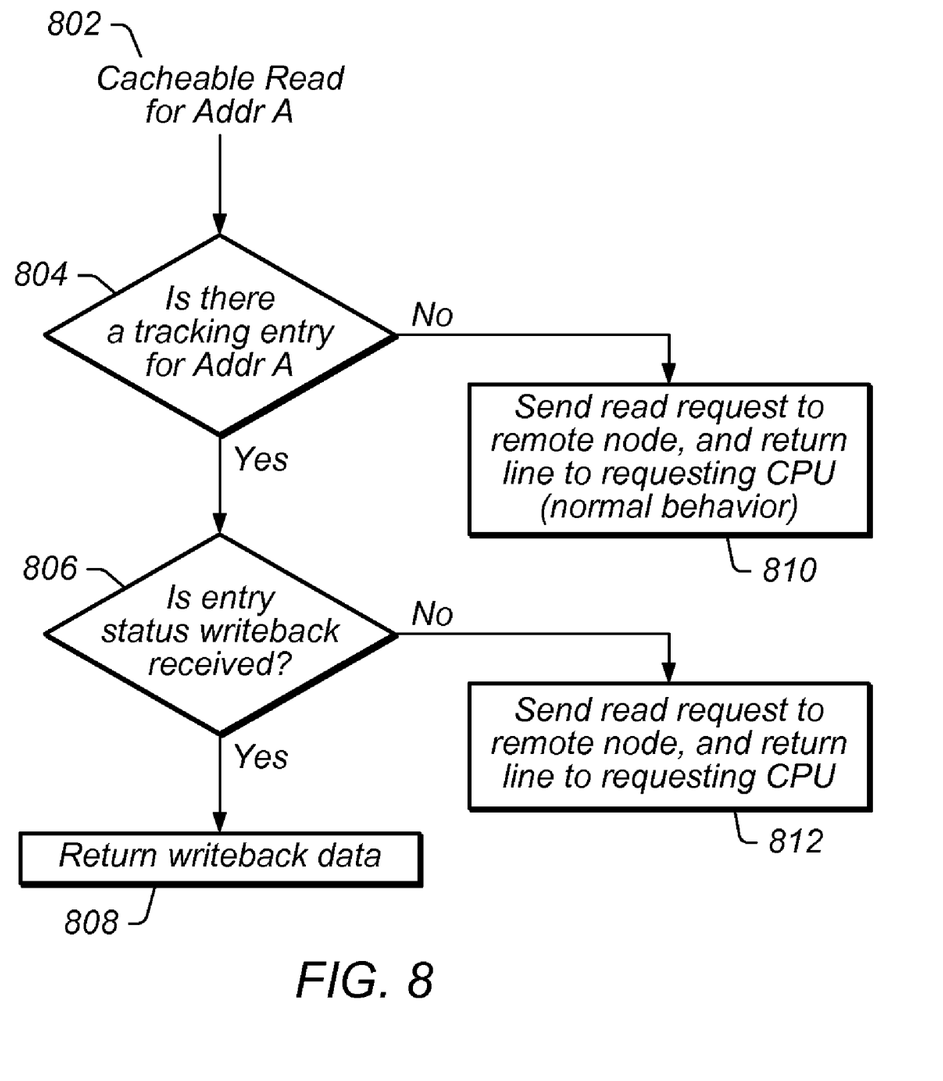
FIG. 8 are flowchart diagrams illustrating operation of a network adaptor during other accesses to address A according to one embodiment of the invention.

FIG. 8—Exemplary Method for Read Operations

FIG. 8 is a flowchart diagrams illustrating embodiments of operation of the network adaptor for other accesses to address A. The method may be performed by software executing on a local node and may be assisted the network adaptor described above. Various method elements may be added, omitted, modified, or performed in a different order.

As shown in FIG. 8, when a cacheable read to Address A occurs (802), in 804 the method determines if there is a tracking entry for address A, indicating that the method described in FIG. 6 above is currently being performed. If a tracking entry is determined to exist for address A in 804, then in 806 the method determines if the tracking entry status is "writeback received for line." If the tracking entry status is determined to be "writeback received for line" in 806, then in 808 the writeback data from the tracking entry may be provided in response to the read request. Thus, the most updated data is provided rather than stale data that may be pulled from the remote memory or local memory before the remote write or local update is performed, respectively.

If a tracking entry is determined to not exist for address A in 704, then in 710 the network adaptor sends a read request to the remote node, and returns the line to the requesting CPU. This is the "normal behavior".

If a tracking entry is determined to exist for address A in 804, and the tracking entry status is not "writeback received" in 806, then in 812 the network adaptor sends a read request to the remote node, and returns the line to the requesting CPU.

Note that in the embodiments of FIG. 8, the SIF may act as a memory controller and return the requested data. The request may be satisfied by data from another CPU's cache if that is deemed more recent by the node's cache coherence protocol.

Further Embodiments and Descriptions

In this method, software may explicitly handle remote updates in addition to making sure that cache coherency is maintained within the node (i.e. among local CPUs that may be sharing cache-lines). In this method, the adapter (and/or the CPU/process) provides two different address maps for the same remote memory. One map represents prefetchable, cacheable remote memory, and the other map represents un-cached remote memory. Software may use the cachable map to prefetch/pre-load remote cache lines as well as to perform updates that will be cache-coherent among the local CPUs. The uncached map may be used to perform remote updates of exactly the words/bytes that has been changed within the cache-line. However, it should be noted that an additional uncached map may be used (e.g., where shared maps are used) to distinguish between a first store and a final signal store, e.g., by the adapter, as indicated below.

Since software has complete control of what remote cache lines can be cached by the CPU at any point in time (i.e. software knows that a cache line will not be flushed due to cache contention), then software can perform only coherent updates as long as the data is only supposed to be visible within the local node. The software can then perform a remote update whenever data needs to be visible in the "home memory" (the remote memory). (e.g., similar to performing an explicit flush when the remote memory should be updated.)

However, typically, software does not have total control of which cache-lines are kept in the CPU cache at any point in time. Hence, in order to prevent an "accidental" writeback of a complete cache-line to remote memory, the adapter may refuse to perform cache-line writebacks that occur for the cacheable map. (Software controlled cache flushes can be accepted as long as the adapter can distinguish between explicit software generated flushes and hardware generated writebacks that are not controlled by software.)

If software does not control which remote cache lines are located in the local CPU cache, then there is a major hazard that updates can be lost unless software makes sure that any updates are also sent to the home or remote memory for the cache-line. This may be implemented by storing via the un-cached remote memory map.

The following describes various issues, corner-cases and race-conditions that may occur in various embodiments of the invention.

One alternative is to use the cached map only for reads/prefetches and perform all updates via the un-cached map. The disadvantage with this is that it prevents coherent sharing of the cache-line among the CPUs on the local node. (since updates will not be reflected by the intra node coherency protocol.)

One way to address the local coherency problem is to have the adapter keep track of the relationship between cache-lines addressed via the cached map and the corresponding address in the un-cached map. Utilizing this knowledge, the adapter can perform a coherent local update as a side-effect of receiving the un-cached store. With a coherency protocol that is based on distributing new values to caches already containing a (read-only) version of the cache-line, this scheme could be very efficient (i.e., similar to the CPU performing the update itself). However, if the coherency protocol is based on invalidating all other copies upon a write, then this scheme will effectively cause invalidation of the cached copy also for the updating CPU. Hence, if software desires to continue to access the cached copy after performing updates, then this scheme implies a negative impact on performance (e.g., since the invalidation will cause a new fetch of the cache line from either the local adapter or all the way from the remote home memory).

In order to allow the updating CPU to continue to use the cached copy following updates also with the invalidation based coherency protocol, software updates both the cached copy and performs an un-cached update of the remote home memory. However, since this implies that the same logical update is implemented as two independent stores, this scheme creates various race conditions unless it can be guaranteed that the two stores will be executed as an atomic sequence where the CPU pipeline is not interrupted. In the general case, this is not possible to guarantee since the CPU executing in user mode can be interrupted between any pair of instructions.

The race condition that can occur is that if the cached store happens before the uncached (remote) store, then invalidation of the cache lines can cause other local CPUs to re-load the line from the remote home memory before the remote update has taken place. If the remote update takes place before the cached (local) update, then remote CPUs may act upon the new value that is still not visible to other local CPUs, hence a synchronization error may occur.

The following describes handling of special cases in one embodiment (similar to the method of FIGS. 6-7B, described above). In order to avoid the race conditions, the system may include the following enhancements.

In one case, the store sequence is remote first then local (but note that the remote write is actually sent after the local completes), but in addition, a third store operation is introduced in order for the adapter to know when a local cache update has taken place:
Store remote (seen by adapter)
Store local (may not be seen by the adapter)
Store "signal" (seen by the adapter)

In one embodiment, the signal store is to a specific register or address associated with the relevant software thread context. However, this may not always be possible because the remote maps may be shared by multiple threads. Instead, the signal store may use an address that has a well defined relationship with the remote store (e.g. some MSB bit in the bus address is used to identify signal store). In order to keep track of the potential for multiple threads all storing to the same remote address, the stored value should also be used for identification of the transaction so that multiple remote stores from different local threads can be in progress concurrently. In principle, it is also possible to use a doorbell based scheme where both the address and data is supplied, and the doorbell uniquely identifies the thread/process. However, this indirection will typically add overhead, and is therefore in general not desirable.

One enhancement for the network adapter implementation is that the adaptor keep the initial remote store in a store buffer (one store buffer per relevant software thread context within all the CPUs on the local node) until the signal store is received for this context.

When the signal store is received, the pending store operation in the corresponding store buffer may be sent to the remote node. This may inhibit or prevent remote CPUs from seeing the update before it is visible to local CPUs. However, there is still a hazard in that a local CPU can issue a cache line fetch request for the corresponding line, while a remote store is still pending in a local store buffer.

In order to make sure that any cache line fetch will (also) reflect pending local updates, the adapter may keep track of fetch operations for any remote cache line that has an associated pending store. However, since the local cache-coherence protocol will make sure that any local updates are made coherent among the local nodes (independently of the un-cached remote stores), the main issue to consider is when any of the local CPU caches issues a writeback (which will then be routed to the adapter). The adapter may ensure that any writeback where the cache-line address overlaps with any pending store is recorded in association with each such store. If a remote fetch occurs when the remote store is still pending (i.e., waiting for the corresponding signal store), then the latest writeback value (cache line) will be returned to the requesting CPU cache. Whenever, the corresponding remote write(s) is (are) committed by the corresponding signal store, and posted to remote memory via the corresponding connection, any associated stored writeback cache line will be discarded.

Remote fetch operations that occur after the remote store has been sent from the adapter will not cause any dependency on the store buffer(s) since both the remote stores and the remote fetches use the same ordered connection to the remote home memory (i.e., remote fetches issued after a store are guaranteed to see contents of remote memory that reflect the remote store).

Coherence with Remote Memory

One rationale for returning locally stored writeback cache-lines and not just performing a remote fetch as long as at least one associated remote store is pending is that the local coherence must be maintained also when there is no longer any local copy of the cache-line in any local CPU cache. Another issue is that dependency on a particular update order for remote memory should be based on (global) synchronization that involves total ordering relative to any remote update transaction (see below). Hence it is possible to implement an additional level of caching/buffering in the adapter.

Relative to local caching of remote memory, fetching of a remote variable that is known to have a fresh remote value (where this knowledge is based on the result of some global synchronization operation that does not involve the cache line(s) that the remote variable resides in) also implies explicit flushing of any local cache-line associated with the remote variable. In other words, if a local CPU learns that remote data is available, then it makes sure that the relevant cache line(s) are not in the local cache before performing the remote fetch. However, as long as concurrent updates from local CPUs (false sharing) may be active, which thereby implies that an older version of the cache line is pending in the adapter, then it is critical that the fetch does just return the adapter's current copy of the cache-line.

One solution to the stale cache-line issue is for the adapter to provide an explicit flush operation (e.g., similar to conventional IO bridges with write-combining or prefetch logic that implies a caching scheme that requires explicit software flushing). The adapter will receive a flush request identifying the cache-line(s) and will signal completion of the flush whenever it can insure that a subsequent fetch will reflect a value that has been fetched from remote memory after the flush request was received.

As long as the flushing of the CPU caches and the adapter cache is not synchronized, one important issue is that the flushing taking place in an order that reflects the most distant (from the executing CPU) cache first, and then subsequently the next level(s). In this way, the thread that executes the flush+fetch sequence is guaranteed that no concurrent fetch from another thread will bring in a stale value in the caching hierarchy before this thread eventually executes the fetch.

A special case to consider here is if there is a constant stream of remote updates to the same cache line(s) from other CPUs/threads. This could potentially starve the adapter flush forever because there would always be a current writeback value of the cache line. In order to prevent such live-lock, the adapter may either implement a timeout for the flush operation, or at some point the adaptor "throttles" further remote stores so that the pipeline eventually will drain. A throttle operation would typically require explicit participation by software (i.e., by software threads involved in concurrent remote update transactions.)

Automatic Merging Instead of Explicit Flushing

The software complexity of the inherently asynchronous flush operation described above may in many cases represent a significant overhead without providing any benefits in terms of additional caching capacity. In other words, the number of cache-line buffers implemented in order to support remote update transactions is so small that there will hardly ever be any caching benefit relative to overflow in the CPU caches. More specifically, the cases where a remote fetch can be serviced by the adapter using one of the writeback buffers and where there is no dependency on fetching any part of the cache line from remote memory is not expected to be very significant, and would in addition most likely be outweighed by the additional overhead and latency associated with the cases that requires flush.

Still, it is conceptually possible to provide a very large adapter controlled cache (i.e., coherent relative to local node CPU caches, but only software based coherence relative to the corresponding remote memory and caches on remote nodes) that may have a significant performance effect for some workloads (i.e. depending on update patterns, local cache sizes and average remote memory fetch latency). Hence in such cases, the explicit adapter level flush scheme may be used.

An alternative scheme that provides less software overhead relative to the above scheme is for the adapter to make sure that any cache-line fetch will always reflect the current contents of remote memory, but that it will also reflect any pending store operations in this adapter. This implies that the adapter always fetch a copy of the cache-line from the remote memory, and then apply any pending updates that have not yet been sent to remote memory. An important aspect of applying pending updates is that the updates be coherent with the updates of the cache-line that has been implemented by the local CPUs via the local coherency protocol. In order to ensure this coherency, the adapter updates exactly the same bytes as any of the local CPUs have updated, and the sequence in which the (potentially overlapping) updates take place is exactly the same.

The above requirements represent a non-trivial problem because in order to keep track of which bytes have been updated, the adapter observes the initial remote store operations. In order to observe the correct sequence (store order—see below), the adapter uses the cache-line writeback operations. More specifically, for each remote update store, the adapter records which bytes in the corresponding cache-line are being updated (part of the transaction context that lives until the signal store causes the corresponding remote update to be committed). In this way, the pending store transactions logically represent one ore more lists of one or more stores for a cache-line. Whenever the store is committed and sent to the remote node by the signal store, the corresponding store is removed from the list it was part of.

Whenever the adapter receives a writeback of the corresponding cache line, it will keep it as current (new writeback operations will overwrite the previous). If the adapter receives a remote fetch when there is a remote update transaction pending for the corresponding cache-line, it will issue the remote fetch and will then copy the byte numbers that it has recorded as locally updated from the local writeback copy to the fetched copy before supplying the resulting cache-line to the requesting CPU.

A remote fetch in progress will imply that the writeback buffer will remain pending also if all related remote update transactions have been committed by the corresponding signal stores. When the remote fetch has completed, the writeback buffer can be released.

If additional remote store transactions are initiated for a cache line with a writeback copy in the adapter while a remote fetch is in progress, then the corresponding writeback buffer will remain active also after the fetch has been completed (i.e. until no more stores are pending).

If a remote fetch is initiated and no writeback copy exists, then the line fetched from remote memory will be delivered unmodified to the requesting CPU independently of whether a remote update transaction has been initiated for it. In this case, local coherence will be enforced by the node-local coherence protocol after the fetch has completed and been delivered to the requesting CPU. In the above situation, no writeback copy exists where, e.g., no CPU has currently any cached value, or some remote update transaction has been initiated but the corresponding cache-line access implied a fetch, or some remote update operation has been initiated but another CPU caused a fetch request before any cached store was initiated by the CPU performing the remote update transaction.

If a cache-line writeback operation occurs after a remote fetch has been initiated, then the line will be updated with any updated bytes from the writeback copy (i.e. based on the records from the associated remote store operation(s)), before being supplied to the requesting CPU (i.e. just like the initial case above).

Limited Number of Concurrent Remote Update Transactions

Since the adapter will have a limited set of resources to handle remote update (and flush) transactions, software is responsible to make sure that the number of concurrent transactions is never higher than what the adapter can handle. This includes both the assignment of which resources can be consumed by which processes (handled by privileged driver/operating system software) as well as the number of threads within a process group/application that may be actively generating remote update transactions at any point in time (handled by the user-level application/run-time system).

Cleanup of Uncompleted Transactions

Since a user thread may die in the middle of a remote update transaction, one embodiment of the invention includes a mechanism that allows cleanup of the adapter resources to take place if a resource is occupied and the thread that was supposed to perform the corresponding signal store is no longer alive. This can be implemented in different ways, but can in principle involve either a complete reset of the set of resources that are used for a process/application (i.e. if the complete application has been terminated), or individual resources may be reset/flushed based on either an explicit association between thread and resource, or based on that the run-time and/or operating system can sort out which resources are left in a permanent "pending" state and/or what transaction state a died thread was involved in. As long as the transaction state in the adapter includes the local address that represent the corresponding address map, privileged software can sort out which maps are active and thereby indirectly which processes may have used the transaction resource (i.e. since the map may be private to a single process or group of processes within a single application).

Store Ordering and Atomic Operations

A consequence of the multiple store operations involved in a remote update transaction is that the sequence of stores observed by local threads/CPUs may not be the same as the sequence observed on the remote memory (even if only a single node performs updates in the relevant period). In general, the sequence of cached stores and the local coherency protocol determines the sequence of stores (values) observed between CPUs on the local node. On the other hand, the sequence of signal stores determines how the same (logical) sequence of stores is observed at the remote memory location. Since the store sequences of the different local threads may be interrupted and also interleaved among the different threads due to arbitrary execution speed differences in general, the local and remote update orders may be totally different.

In embodiments of the invention, software level synchronization is used to ensure that any particular coherent store order between the local node and the remote memory unless explicit is used. Hence, applications that depend on making sure that some sequence of updates are observed in a particular order preferably use a synchronization mechanism (or may potentially revert to un-cached remote memory access if that represents better performance or significantly less complex synchronization). One implication is that it is not straightforward to implement globally atomic operations using the transaction based remote update scheme. Instead, the application or run-time software preferably uses global synchronization variables that are not cached by remote nodes. However, any synchronization variables that are located in the local memory of a node can be cached by local CPUs as long as the adapter supports compatible atomic operations that work in concert with the local coherency protocol. Still, even if ordering of operations between local cache accesses and remote memory could be enforced without additional software level synchronization, there is no real value in implementing atomic operations on both a cached copy as well as the remote (home) memory as two distinct steps. As long as the executing thread can not proceed until also the remote operation has been implemented and acknowledged, there is no real benefit relative to the un-cached version.

Optimizations to Reduce Average Remote Update Overhead

As long as the CPU store pipeline is very efficient and sufficiently deep, the execution of two additional un-cached stores along with each remote memory update may not cause a significant performance impact. Still, for algorithms that perform a relatively high number of stores, the performance impact may be an important concern.

One way to reduce the impact of this in cases where software knows which stores may involve a false sharing conflict for a cache line is the following:

For each remote memory segment, an additional map is created (i.e. in addition to the cached and un-cached map described above). The additional map would represent cacheable remote memory like the already defined cacheable mapping. However, unlike the already defined map, this map would allow cache-line writeback at the adapter level.

The implication for software is that whenever a remote update is performed, only a single store to the "cached with writeback allowed" mapping is required for any update that does not represent a hazard for false cache-line sharing with any remote CPU. (False sharing with local CPUs is still ok from a correctness perspective since in this case, the local coherency protocol will ensure correct results.)

An example where this approach might provide value is updating of a section of a remote array where only some entries in the beginning and end of the array section imposes a hazard for false sharing, but where all the entries between are safe in this respect. In this case, software would only use the "3 step" update for the boarder entries, whereas the single cached update (with writeback allowed) would be used for all the middle entries.

One disadvantage of adding the additional map is that it consumes map capacity at the adapter, as well as node physical address space.—All cacheable mappings must be implemented using the same physical address ranges as seen from all local CPUs in order to ensure local coherency. However, the un-cached maps may be private per CPU and may also change over time as long as the correct associations with the cacheable maps are maintained.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for managing operations in a first compute node of a multi-computer system, wherein the multi-computer system comprises a plurality of compute nodes coupled together by a network, the method comprising:
   receiving a remote write to a first address of a remote compute node, wherein the remote write is issued by a first process executing on the first compute node;
   creating a first data structure entry in a data structure, wherein the first data structure entry comprises the first address and status information indicating that the remote write has been received;
   receiving a writeback operation to the first address prior to a local cache of the first compute node being updated with the remote write, wherein the writeback operation comprises writeback data;
   maintaining at least one first memory map which represents prefetchable, cacheable remote memory;
   maintaining at least one second memory map which represents uncached remote memory;
   determining if the first address of the writeback operation is in the first memory map, wherein the writeback operation is not propagated onto the network if the first address of the writeback operation is determined to be in the first memory map;
   updating the status information in the first data structure entry to indicate that the writeback operation has been received for the first address;
   saving the writeback data in the first data structure entry;
   determining that the local cache of the first compute node has been updated with the remote write;
   issuing the remote write to the remote compute node in response to determining that the local cache of the first compute node has been updated with the remote write;
   releasing the first data structure entry upon completion of the remote write.

2. The method of claim 1,
   wherein said issuing the remote write to the remote compute node after determining that the local cache of the first compute node has been updated with the remote write inhibits a remote CPU of the remote compute node from seeing the remote write before the remote write is visible to a local CPU of the first compute node.

3. The method of claim 1,
   wherein said determining that the local cache of the first compute node has been updated with the remote write comprises determining that a write has occurred to a physical memory address with a predefined association with the first address.

4. The method of claim 1, further comprising:
   receiving a remote write to the first address from a second process executing on the first compute node;
   creating a second data structure entry in the data structure, wherein the second data structure entry comprises the first address and status information indicating that the remote write has been received for the first address.

5. The method of claim 4, further comprising:
   in response to receiving the writeback operation, updating the status information in the second data structure entry to indicate that the writeback operation has been received; and
   saving the writeback data of the writeback operation in the second data structure entry.

6. The method of claim 1, further comprising:
   receiving a read of the first address;
   determining that at least one data structure entry exists for the first address;
   determining that the status information indicates that the writeback operation has been received for the first address;
   returning the writeback data of the writeback operation from the at least one data structure entry in response to the read of the first address.

7. The method of claim 1, further comprising:
   receiving a read of the first address prior to receiving the writeback operation;
   determining that at least one data structure entry exists for the first address;
   determining that the status information indicates that a writeback operation has not been received for the first address;
   performing a remote fetch of the first address; and
   returning data from the remote fetch in response to the read of the first address.

8. A system comprising a plurality of compute nodes coupled together by a network, wherein each compute node comprises a processor, one or more memory mediums, and a network adapter, wherein the system comprises:
   a first compute node; and
   a second compute node, wherein the first compute node stores information at a first address in the one or more memory mediums; and
   wherein the first compute node is configured to:
      receive a remote write to the first address of the second compute node, wherein the remote write is issued by a first process executing on the first compute node;
      create a first data structure entry in a data structure, wherein the first data structure entry comprises the first address and status information indicating that the remote write has been received;
      receive a writeback operation to the first address prior to a local cache of the first compute node being updated with the remote write, wherein the writeback operation comprises writeback data
      maintain at least one first memory map which represents prefetchable, cacheable remote memory;
      maintain at least one second memory map which represents uncached remote memory;
      determine if the first address of the writeback operation is in the first memory map, wherein the writeback operation is not propagated onto the network if the first address of the writeback operation is determined to be in the first memory map;
      update the status information in the first data structure entry to indicate that the writeback operation has been received for the first address;
      save the writeback data in the first data structure entry;
      determine that the local cache of the first compute node has been updated with the remote write;

issue the remote write to the second compute node in response to determining that the local cache of the first compute node has been updated with the remote write; and release the first data structure entry upon completion of the remote write.

9. The system of claim 8, wherein said issue of the remote write to the second compute node after determining that the local cache of the first compute node has been updated with the remote write inhibits a remote CPU of the second compute node from seeing the remote write before the remote write is visible to a local CPU of the first compute node.

10. The system of claim 8, wherein said determination that the local cache of the first compute node has been updated with the remote write comprises determining that a write has occurred to a physical memory address with a predefined association with the first address.

11. The system of claim 8, wherein the first compute node is further configured to:

receive a remote write to the first address from a second process executing on the first compute node;

create a second data structure entry in the data structure, wherein the second data structure entry comprises the first address and status information indicating that the remote write has been received for the first address.

12. The system of claim 11, wherein the first compute node is further configured to:

in response to receiving the writeback operation, update the status information in the second data structure entry to indicate that the writeback operation has been received; and save the writeback data of the writeback operation in the second data structure entry.

13. The system of claim 8, wherein the first compute node is further configured to:

receive a read of the first address;

determine that at least one data structure entry exists for the first address;

determine that the status information indicates that the writeback operation has been received for the first address; and return the writeback data of the writeback operation from the at least one data structure entry in response to the read of the first address.

14. The system of claim 8, wherein the first compute node is further configured to:

receive a read of the first address prior to receiving the writeback operation;

determine that at least one data structure entry exists for the first address;

determine that the status information indicates that a writeback operation has not been received for the first address;

perform a remote fetch of the first address; and return data from the remote fetch in response to the read of the first address.

15. A compute node configured to couple to a network, wherein the compute node comprises:

a processor;

one or more memory mediums;

a network adapter;

wherein the compute node is configured to:

receive a remote write to a first address of a second compute node, wherein the remote write is issued by a first process executing on the compute node;

create a first data structure entry in a data structure, wherein the first data structure entry comprises the first address and status information indicating that the remote write has been received;

receive a writeback operation to the first address prior to a local cache of the first compute node being updated with the remote write, wherein the writeback operation comprises writeback data maintain at least one first memory map which represents prefetchable, cacheable remote memory;

maintain at least one second memory map which represents uncached remote memory;

determine if the first address of the writeback operation is in the first memory map, wherein the writeback operation is not propagated onto the network if the first address of the writeback operation is determined to be in the first memory map;

update the status information in the first data structure entry to indicate that the writeback operation has been received for the first address;

save the writeback data in the first data structure entry;

determine that the local cache of the compute node has been updated with the remote write;

issue the remote write to the second compute node in response to determining that the local cache of the compute node has been updated with the remote write; and release the first data structure entry upon completion of the remote write.

\* \* \* \* \*